United States Patent [19]

Albrecht, III

[11] Patent Number: 4,725,365

[45] Date of Patent: Feb. 16, 1988

[54] BAR SCREEN RAKING APPARATUS AND METHOD OF USE

[75] Inventor: Charles J. Albrecht, III, Taylors, S.C.

[73] Assignee: Dresser Industries, Inc., Dallas, Tex.

[21] Appl. No.: 854,467

[22] Filed: Apr. 21, 1986

[51] Int. Cl.⁴ .............................................. B01D 29/04
[52] U.S. Cl. .................................... 210/791; 210/159; 210/413; 210/527; 210/531; 55/295; 55/296; 55/297
[58] Field of Search ................ 210/159, 407, 413, 415, 210/523, 527, 531, 791; 55/295, 296, 297

[56] References Cited

U.S. PATENT DOCUMENTS

| | | |
|---|---|---|
| 2,128,347 | 8/1938 | Briggs . |
| 3,358,837 | 12/1969 | Tillett . |
| 3,482,698 | 12/1969 | Ostnas .................................... 210/159 |
| 3,591,006 | 7/1971 | Daferner . |
| 4,265,750 | 5/1981 | Meunier .................................... 210/159 |

OTHER PUBLICATIONS

Manual for Installation, Operating, and Maintenance Instructions for Jeffrey Cantenary Bar Screen with Shaft Mounted Reducer, issued Dec. 1985, including, Sections I, II, III and IV, No. 241169.

Primary Examiner—Richard V. Fisher
Assistant Examiner—Jeffrey W. Peterson

[57] ABSTRACT

A rake apparatus for use with a bar screen in a fluid channel that catches debris whereby the rake apparatus enters the channel with reciprocal movement to remove debris caught on the screen bars. The novel raking apparatus has the ability to encounter an obstruction in the bottom of the channel and remove all or part of the obstruction during each cycle of operation without damage to the raking structure. This is accomplished by forming the raking apparatus of an upper section, a midsection and a lower rake section wherein the midsection is rotatably attached to the upper section and weighted to provide a force on the midsection and its attached rake section in the direction of the bar screen. The rake section is pivotally attached to the midsection to allow the rake section to pivot backwards with respect to the midsection if it strikes an obstruction while allowing the midsection to continue its forward motion thereby protecting the apparatus from damage.

26 Claims, 15 Drawing Figures

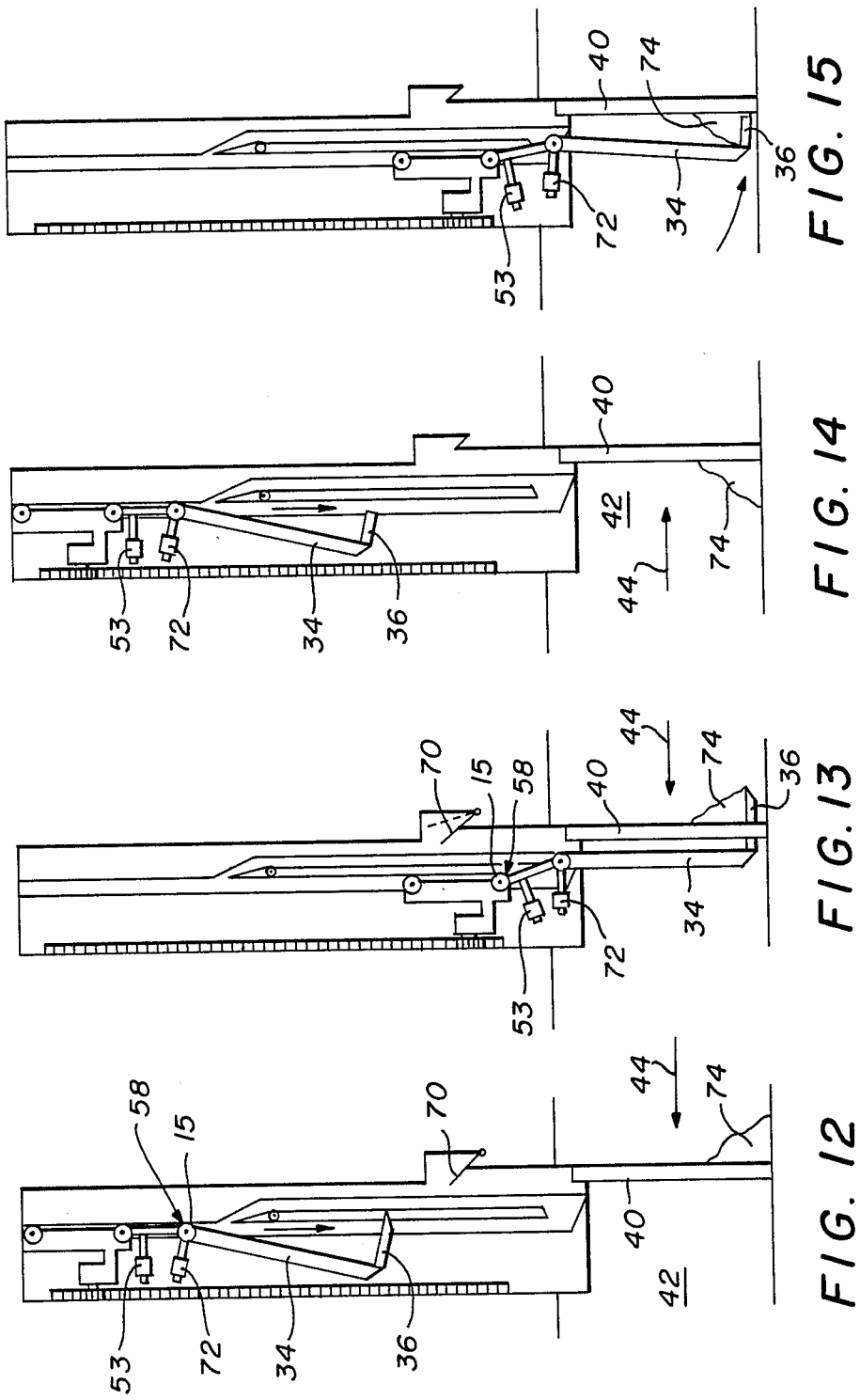

BAR SCREEN RAKING APPARATUS AND METHOD OF USE

BACKGROUND OF THE INVENTION

The present invention relates to a motorized rake assembly that, in conjunction with a bar screen located in a fluid canal or channel to catch and retain debris from the flowing fluid, intermittently enters the channel to rake the bar screen and remove the trapped material. The rake assembly includes a raking arm that enters the fluid channel in a first position generally spaced from the bar screen, is forced toward the bar screen at the bottom of its travel to a second position where the rake can engage the debris, and then moves upward to raise the debris to a discharge point. In particular, the invention relates to such a raking apparatus which has a rake arm pivotably mounted from a guide rake carriage that, as the carriage is pivoted toward the bar screen at its lowest point of travel, permits the rake arm to independently pivot so that should a large obstruction be encountered, the rake arm is free to pivot away from the bar screen and remove all or part of the obstruction during each cycle of operation without damage to the raking structure.

It is necessary in many applications where a fluid or liquid such as water is confined to a channel and which has debris in the fluid which must be periodically removed from a debris catcher, such as a bar screen, to provide an automatic device for removing the debris which accumulates against the screen as necessary from time to time. These devices include some type of a rake which can be lowered into the fluid carrying channel to engage the bar screen and then moved upwardly out of the channel pulling the debris with the rake. When the rake has removed the debris totally from the liquid, some type of automatic device well known in the art, scrapes the rake free of the debris and the rake is then lowered back into the fluid where it again engages the bar screen to remove more of the accumulated debris.

One of the problems associated with the prior art apparatus is the fact that the rake is rigidly attached to a force producing device such as a counterweight which moves the rake toward the screen to remove the debris. If an obstacle is encountered in the liquid which cannot be removed in one continuous motion of the rake, the rake may be damaged by the tremendous forces that are suddenly applied to it by one force trying to move it forward and the other force trying to stop the forward movement. Also, the rake system must be stopped while the debris is removed in some other manner such as manually.

The present invention overcomes the difficulties and problems of the prior art by providing a raking apparatus which comprises a generally vertical guide frame and a carriage portion mounted thereon for guided reciprocal motion. The carriage assembly has an upper section, and a midsection rotatably coupled to the upper section. A rake arm, including the rake, is pivotally attached with the midsection. The upper section has guide rollers and carries the power source for moving the raking structure up and down to carry the rake into and out of the fluid canal. The midsection has guide rollers which follow a predetermined path to lower the rake into the fluid canal while supporting the rake in a first position generally spaced from the bar screen. The midsection is weighted to cause the rake to move to a second position toward the bar screen to engage the debris that is lodged against the screen. Because the rake and rake arm are pivotally attached to the midsection, if the rake encounters an obstacle which prevents it from moving further in the direction of the bar screen, the rake arm, and rake, pivots away from the bar screen with respect to the midsection to allow the midsection to continue its forward motion toward the bar screen without forcing the rake against the obstruction thus protecting the rake arm and rake and reducing the shock that would be applied to the raking assembly as a whole. The rake, however, is biased towards the bar screen by the midsection (as by counterweights) to freely engage the obstruction to remove it at least a portion at a time.

In addition, a single gear rack is utilized with appropriate limit switches to control the upward and downward movement of the entire structure.

SUMMARY OF THE INVENTION

Thus, the present invention relates to an improved raking apparatus for use in conjunction with a bar screen in a fluid carrying channel to remove debris from said screen and having a stationary guide frame, a reciprocating raking structure mounted for guided movement in said frame and having a rake depending therefrom, guide tracks on said guide frame for receiving and directing guide means on said raking structure, drive means coupled to said guide frame and said raking structure for movement of said raking structure up and down said guide tracks into and out of said fluid carrying channel, and means for causing at least said rake to move from a first position generally spaced from said screen to a second position generally adjacent said screen at the bottom of said downward movement of said raking structure for removing debris caught on said bar screen as said rake structure is moved upwards out of said channel, the improvement comprising an upper carriage section of said raking structure for guided reciprocal movement towards and away from said fluid carrying channel, a midsection rotatably coupled to said upper section for pivotal movement from a first position spaced from said bar screen to a second position to enable debris to be removed from said bar screen, and a lower section including said rake pivotally associated with and carried by said midsection from said first position to said second position for removing debris from said bar screen and having pivotal movement with respect to said midsection only in a direction away from the bar screen whereby when said rake encounters an obstacle too large to remove as it travels from said first position to said second position, said lower section pivots away from said bar screen as said midsection continues said movement toward said bar screen.

The present invention also relates to a method of improving a raking apparatus for up and down movement into and out of a fluid flow channel to remove debris caught and retained by a bar screen therein comprising the steps of guiding an upper carriage section of said raking apparatus for reciprocal travel towards and away from said fluid carrying channel, rotatably coupling a midsection to said upper section for pivotal movement from a first position spaced from said bar screen to a second position toward said bar screen and pivotally carrying a lower section, including said rake, with said midsection from said first position spaced from said bar screen to said second position toward said bar screen, said lower section having pivotal movement with respect to said midsection only in a direction away from said bar screen whereby when said rake encounter an obstacle too large to remove said lower section pivots away from said bar screen as said midsection continues said movement from said first position to said second position toward said bar screen.

BRIEF DESCRIPTION OF THE DRAWINGS

These and other objects of the present invention will be more clearly disclosed in connection with the accompanying drawings in which:

FIG. 12 is a schematic side view of the novel raking structure in its upper most position for use with a vertically oriented bar screen and for clearing debris from the bar screen from the down stream side thereof;

FIG. 13 is a schematic side view of the novel raking structure of FIG. 12 in its lower most position with the rake teeth penetrating the bars of the debris catching screen to remove the debris from the upstream side;

FIG. 14 is a schematic side view of the novel raking structure in its upper most position for use with a vertically oriented bar screen and for clearing debris from the bar screen from the upstream side, and FIG. 15 is a schematic side view of the novel raking structure of FIG. 14 in its lower most position on the upstream side of and moving toward the bar screen to remove the debris.

DETAILED DESCRIPTION OF THE DRAWINGS

Figures 1, 2:
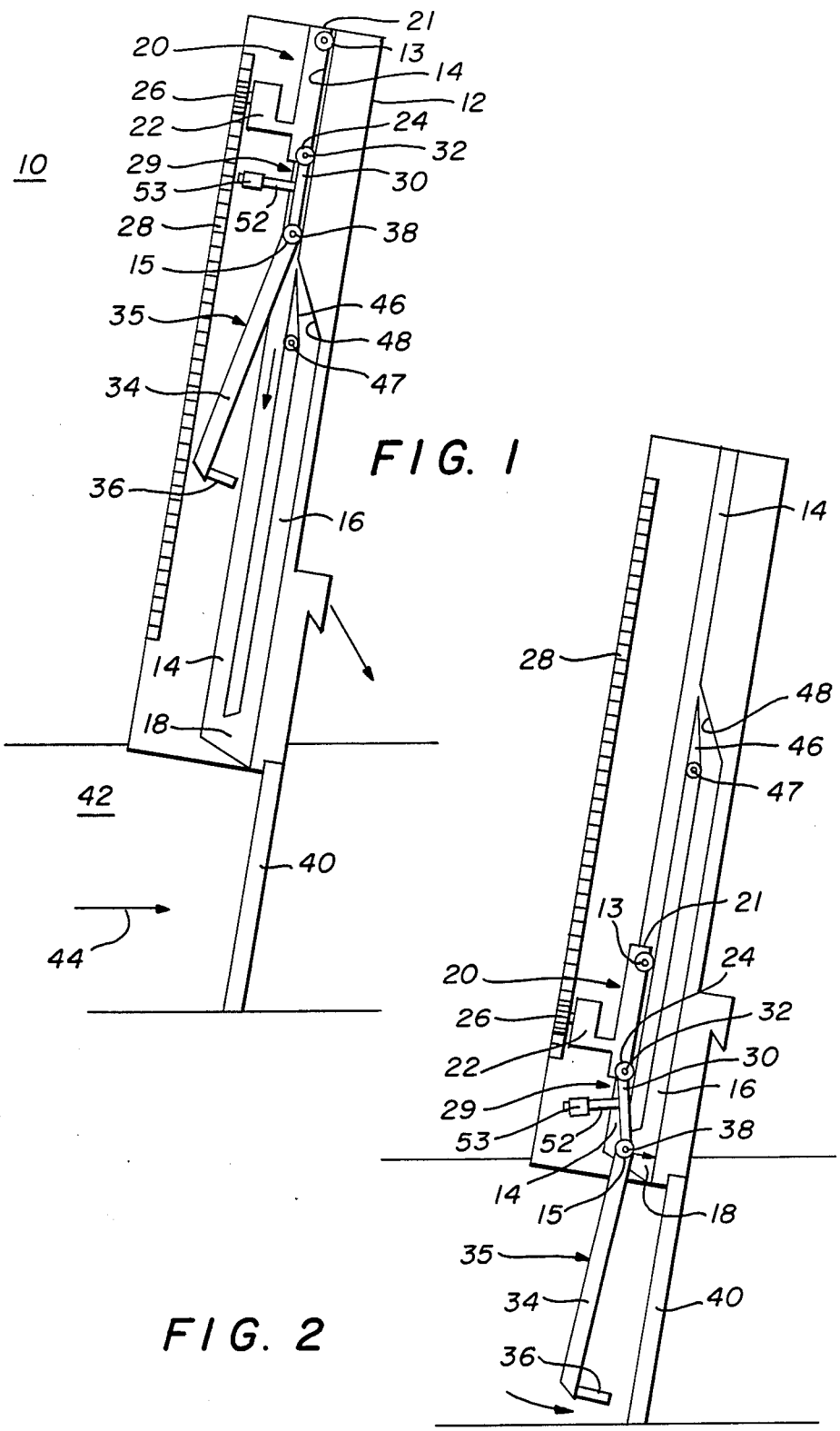
FIG. 1 is a schematic representation of the novel raking structure in its upper most position with guide wheels in a first channel whereby it may begin its downward descent into the fluid carrying channel.
FIG. 2 is a schematic representation of the novel raking apparatus in its lowest downward position in which the midsection or rake control assembly is pivoting with respect to the upper carriage section with guide wheels moving in a transition channel and allowing the lower rake section to move toward said bar screen.

The novel raking structure is designated by the numeral 10 as shown in FIG. 1 and comprises a stationary guide frame 12 having a first guide channel 14 thereon for receiving guide rollers or wheels 13 and 24 of a first upper section 20 for up and down movement in said channel 14. It will be noted that frame 12 slopes to the right in FIG. 1 thus causing channel 14 to slope accordingly. A second sloping channel 16 is formed parallel to and spaced from the rear of said first channel 14 in the direction of fluid flow as indicated by arrow 44 as it flows in channel 42. It will be noted that second channel 16 extends below first channel 14.

Raking structure 10 has a midsection 29 rotatably attached to the upper section 20 at pivot point 32 about which guide wheel 24 is located. A lower section 35, the rake assembly, is pivotally attached at point 38 to the lower portion of midsection or rake control assembly 29 and is held in a first position generally spaced from the bar screen 40. Further, a midsection guide wheel 15 is formed at pivot point 38 and is guided by channel 14. A drive motor 22 is attached to the upper carriage portion 20 to turn a gear 26 which is engaged with a gear rack 28 to cause the structure 10 to move upwardly and downwardly into and out of the fluid channel 42.

When the structure 10 has reached the bottom of its travel, guide wheel 15 on the midsection 29 is forced by the weight of the structure and counterweight 53 on arm 52 to carry rake assembly 35 from its first position generally spaced from bar screen 40 to its second position for removing debris from bar screen 40 at the lower end of the second channel 16. Thus the rake assembly 35 is carried by midsection 35 with guide wheel 15 passing through transfer channel 18.

This second position is shown in FIG. 2 in which the rake structure 10 is now at its lower most position with respect to channel 14 with the guide wheel 15 moving through transition channel 18 from the bottom of channel 14 to the bottom of channel 16. As can be seen, rake assembly 35 now moves to its second position towards bar screen 40 where rake teeth 36 can contact and lift any debris that may be retained by said bar screen 40.

Figure 3:
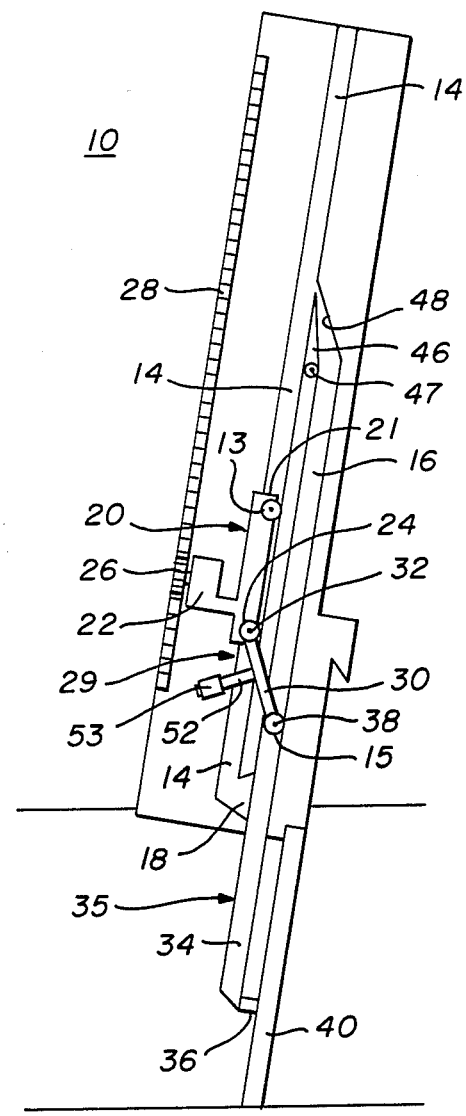
FIG. 3 is a schematic representation of the novel raking apparatus as it begins its upward movement with the guide wheels of the midsection now in a second channel parallel to and spaced from the first channel for upward movement bringing the rake upward and thus removing the debris.

FIG. 3 illustrates the raking structure 10 in its second or raking position as the assembly begins to move upwardly raking the debris from the screen 40 with teeth 36. It will be noted that guide wheel 24 of upper structure 20 remains in guide channel 14 while guide wheel 15 of the midsection or control assembly 29 is now in spaced parallel channel 16. As the structure 10 continues upwardly, it will come to a point where guide wheel 15 on control assembly 29 will reach a slanted or sloped shoulder 48 which forces guide wheel 15 into a hinged gate 46 which is allowed to open only to the left in FIG. 3 into channel 14. This allows guide wheel 15 to reenter channel 14 by control assembly 29 rotating clockwise about pivot point 32 which pivotally attaches control assembly 29 to the upper assembly 20. At the same time, means well known in the art removes the debris from the rake teeth 36 and discharges the debris at 50. Since such discharge apparatus is old and well known in the art and is not part of the present invention, it has not been shown in detail in this application.

Thus, the raking structure 10 returns to its uppermost position with all three guide wheels 13, 15 and 24 now in channel 14 ready for the downward movement of the raking structure 10 to repeat the process.

Figure 4:
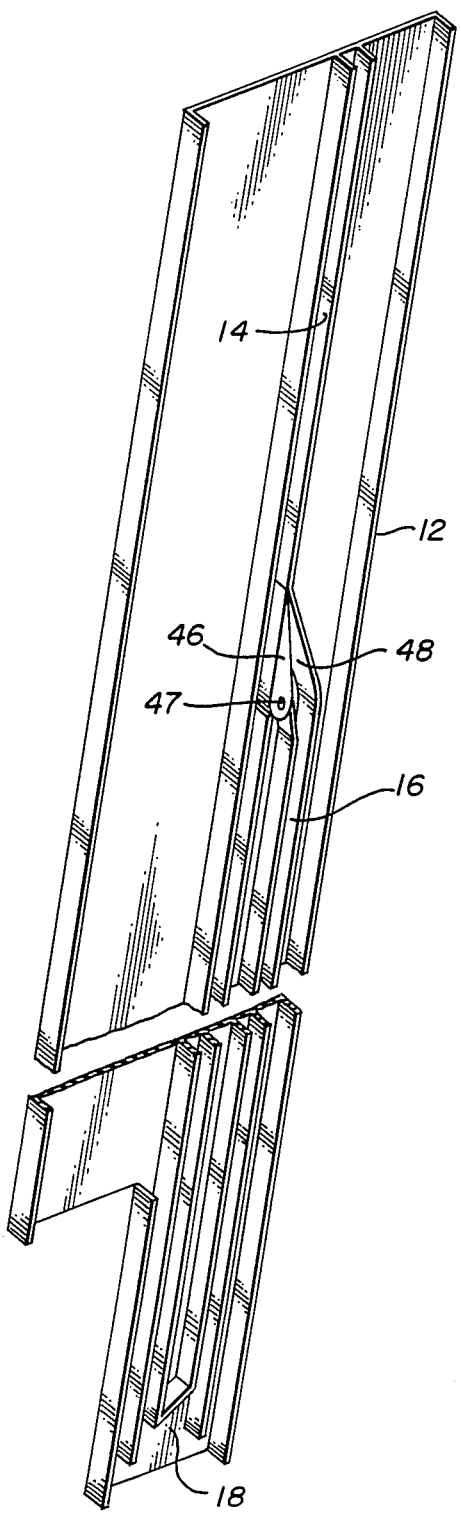
FIG. 4 is a partial schematic representation of one side of the guide frame illustrating the first and second parallel sloping channels which receive the guide rollers or wheels of the upper section and the pivotable midsection and which allow the rollers of the midsection to follow the first channel to the bottom of its travel path and then move in a transition channel in the direction of the bar screen into the second channel for upward movement and back through a pivotal gate into the first channel as it approaches the top of its travel.

FIG. 4 is a schematic representation of one of the sides of stationary guide frame 12 illustrating tracks 14 and 16 and the hinged gate 46 which allows the appropriate guide wheel to travel down channel 14, through transition channel 18 to the rear channel 16, and upward in channel 16 to pivotable door 46 which pivots about point 47 and opens into channel 14 thus allowing the guide wheel 15 to return to channel 14 for the process to be able to repeat itself.

Figures 5, 6:
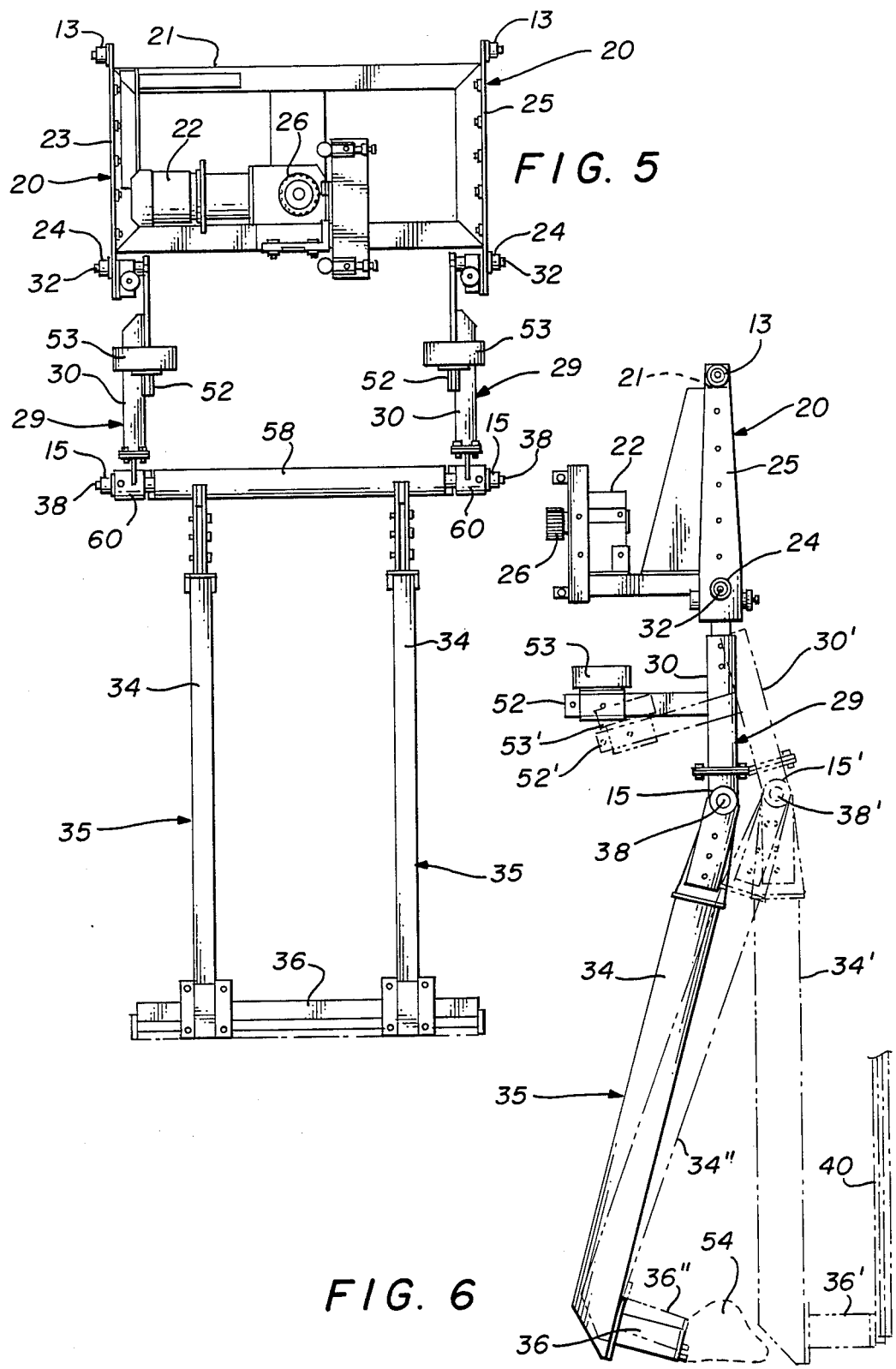
FIG. 5 is a back view of the raking structure illustrating the upper carriage section with the drive motor thereon, the pivotal midsection coupled thereto by means of rotary shock absorbers and having arms with counterweights thereon and the lower section which is pivotally attached to the midsection and also which has the rake attached thereto.
FIG. 6 is a side view of the novel raking structure of FIG. 5 showing the rake in several of its possible positions with the rotary shock absorber positioned between the upper carriage section and the midsection.

FIG. 5 is a rear view of the novel raking structure 10. As can be seen in FIG. 5, upper section 20 has horizontal bar 21 with depending spaced arms 23 and 25 and has guide wheels 13 at the upper corners thereof and a drive motor 22 mounted thereon for driving a gear 26. The midsection or rake control assembly 29 includes spaced arms 30 extending upwardly and attached to respective arms 23 and 25 and is rotatably attached to the upper section 20 at pivot points 32 by a rotary shock absorber 33 to protect the rake structure from damage from unrestricted forward motion of said midsection 29 and its attached lower rake section 35 which are forced toward bar screen 40 by the structure weight and counterweights 53 as guide wheels 15 make the transition travel from channel 14 to channel 16 through connecting channel 18. Guide wheels 24 also rotate about pivot points 32.

The lower portion or rake assembly 35 has a pair of arms 34 pivotally attached to the lower end of the midsection or control assembly 29 by horizontal cylinder 58 along the center line of pivot points 38. Guide wheels 15 also rotate about pivot points 38 as indicated earlier to guide the lower end of midsection 29 in its transition from channel 14 to channel 16 through connecting channel 18. The rake 36 is attached to the pair of rake assembly arms 34 as indicated.

FIG. 6 is a side view of the novel rake structure shown in FIG. 5 and illustrating the movement of the control assembly 29 and rake assembly 35 when the rake structure 10 reaches the bottom of its travel. Thus, as has been explained with respect to FIG. 1, as the rake structure 10 travels down the guide channel 14 toward its bottom position, the midsection or control assembly 29 remains aligned with the upper portion 20 while the rake assembly 35 is held in an initial position at an angle to control assembly 29 by means of projections at the pivot point thereof which will be discussed further in relation to FIGS. 8, 9, 10 and 11. Thus rake assembly 35 is held in a first position generally spaced from bar screen 40. When the rake structure 10 reaches its lower most position of travel as indicated in FIG. 2, the guide wheel 15 drops out of channel 14 and is forced through channel 18 to channel 16 to carry raking structure 35 to a second position for raking debris from bar screen 40 as shown in FIG. 2 by the structures own weight and counterweights 53. This forward motion is controlled and restrained by rotary shock absorbers 33 as explained earlier to prevent damage to the entire structure as said guide wheels strike the wall forming channel 16 or rake teeth 36 strike an obstacle. The result as indicated in FIG. 6 shows that midsection 29 pivots about pivot point 32 as it moves toward bar screen 40 and assumes the position shown by the arms at 30'. It carries with it the rake assembly 35 which assumes the position shown by the arms at 34' where the rake teeth 36' are in contact with any debris caught by the bar screen 40. The assembly then moves upwardly as described previously in relation to FIG. 3.

Figure 7:
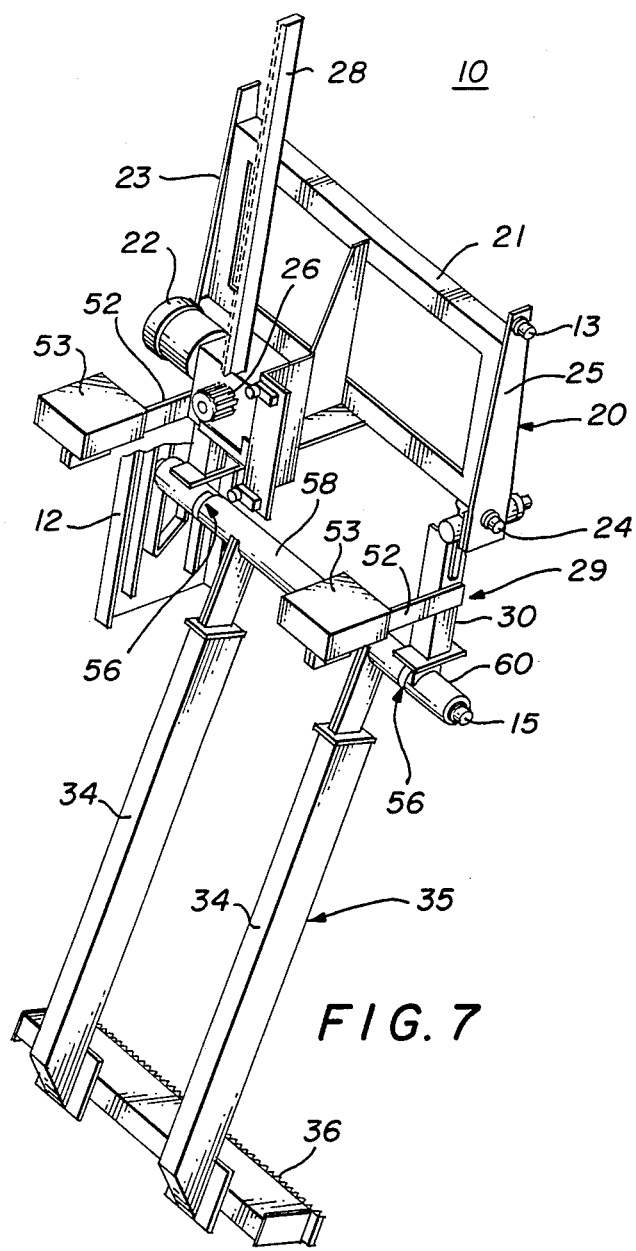
FIG. 7 is an isometric view of the novel raking structure illustrating the gear rack which is operatively associated with a gear driven by the power source on the upper carriage section for driving the assembly into and out of the channel and also illustrating the counterweights on the midsection for causing the lower rake section to move from a first position generally spaced from the bar screen to a second position toward the bar screen for removing debris from said bar screen.

As stated earlier, when control assembly 29 pivots about pivot point 32 so that arms 30 assume position 30' in FIG. 6, a pair of counterweights 53 shown in FIG. 7 on arms 52 actually assist the weight of midsection 29 and rake assembly 35 as well as any pressure from fluid flow on rake assembly 35 in forcing assemblies 29 and 35 to the right in FIG. 6. As can be imagined, the combined weight of assemblies 29 and 35, the pressure from any fluid flow on assembly 35, if such exists, and counterweights 53 cause the entire assemblies 29 and 35 to move with great force. A sudden stop by rake teeth 36 striking bar screen 40 or some other obstacle or drive wheel 15 reaching the end of transition channel 18 and striking a wall forming channel 16 may cause a severe jolt which could damage some of the elements of the system.

Therefore, a shock absorber 33 is placed at the pivot point 32 on each side of the structure to absorb some of the load of assemblies 29 and 35 as they rotate with respect to each other. In the construction shown rotary shock absorbers 33 are used. Such a rotary shock absorber 33 may be of a type well known in the art which are commercially available. Obviously, with different type construction, as where the pivot point 32 for midsection 29 was placed on a separate arm (not shown) moved to the left in FIG. 6, frame 20 arms 23 and 25 could be extended downwardly and a linear shock absorber of proper size inserted between the extended arms 23 and 25 and the rearwardly moved midsection 29. The important concept is to protect the apparatus from damage caused by sudden stops as powerful forces move midsection 29 and rake assembly 35 toward the bar screen 40.

Note in FIG. 6 that arms 34 of the rake assembly 35 are held in an initial position at an angle with respect to midsection or control assembly 29 or in a first position generally spaced from bar screen 40. Note also with that angle maintained intact, as the midsection 29 moves forward to the position shown by the arms at 30', rake assembly arms 34' are now in a proper position to clean bar screen 40.

Assume, however, that an obstacle 54, which is too large to be removed by the rake assembly 35 in one encounter, is contacted by teeth 36. As the midsection 29 continues to move forward to assume the position shown at 30', the rake assembly 35 pivots from its initial position only in a direction away from bar screen 40 as pivot point 38 moves to point 38' thereby allowing the rake assembly 35 to assume the position shown by the dashed lines indicated as arms 34". Thus, rake assembly 35 is allowed to move or pivot from its initial position only in a direction clockwise with respect to midsection 29 about pivot points 38 and 38' thus preventing any damage from occurring to the equipment because of the rake teeth 36 encountering an object which is too large for it to move. In such case, the teeth 36 will engage and remove that portion of the obstacle 54 that it can move and by repeating the process or cycle several times may be able in fact to remove all of the obstacle 54 before teeth 36 are allowed to reach bar screen 40. It will thus be seen that wear and tear on the equipment is minimized by removing the stresses that are applied to the system when the rake teeth 36 encounter an object which it cannot move in one cycle.

Arms 52 extending to the rear of control assembly 29 have platforms thereon on which the counterweights 53 shown in FIGS. 5, 6 and 7 may be placed to force midsection 29 toward bar screen 40 when guide wheel 15 reaches the bottom of channel 14 and goes through transition channel 18 to the bottom of channel 16 before beginning its upward movement.

An isometric view of the rake structure 10 is illustrated in FIG. 7 in relation to gear rack 28 and illustrating weights or counterbalances 53 mounted on arms 52 to assist in forcing the midsection or control assembly 29 toward the bar screen 40 when guide wheels 15 reach the bottom of channel 14 as described earlier. In addition, FIG. 7 illustrates a gap 56 between pivotal arm 58 on the rake structure 35 with respect to the fixed elements 60 on the midsection or control assembly 29. The jaw gap 56 is formed by complementary abutments on the ends of the arm 58 which form a portion of the rake assembly 35 and the fixed portions 60 of the midsection 29 both of which abutments or projections are arc shaped and extend for approximately 120°. These will be discussed more fully in conjunction with FIGS. 8, 9, 10, and 11. Suffice it to say that the abutments allow arm or tube 58 of rake assembly 35 to pivot in a clockwise direction away from the bar screen 40 with respect to the fixed portions 60 of midsection 29 as shown by dashed lines 34' in FIG. 6 but hold rake assembly 35 in its initial position at an angle with respect to control assembly 29 under normal conditions as illustrated by solid lines 35 and dashed lines 34' in FIG. 6.

Figure 8:
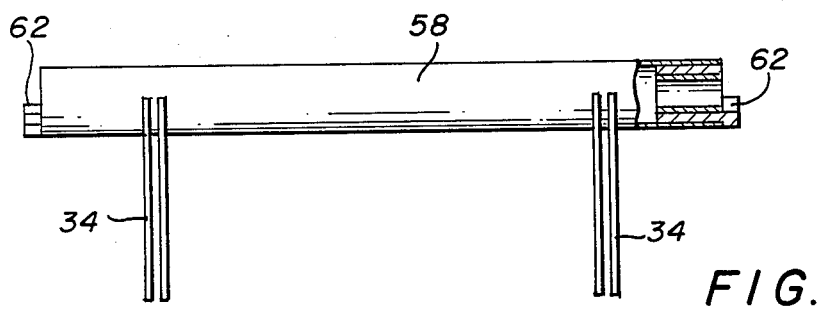
FIG. 8 is a rear view of the pivot point at the junction of the lower section and the midsection illustrating projections on the ends of the lower section which are in the form of an arc of approximately 120° which engage a corresponding abutment or projection on the mating portion of the midsection thereby causing the lower section with the rake to be held in an initial position at an angle with respect to the midsection and yet allowing the lower section to pivot from its initial position in a direction away from said bar screen if the rake attached thereto strikes an obstacle during movement of said rake from a first position generally spaced from said bar screen to said second position toward said bar screen.

The tube or arm 58 which forms a part of the rake assembly 35 is illustrated in FIG. 8. It will be noted that on each end thereof is a projection 62. Note in FIG. 9 that the projection 62 is in the shape of an arc and extends for approximately 120°.

Figure 10:
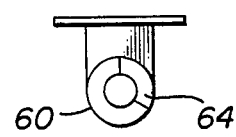
FIG. 10 is an end view of the mating 120° arc projection on the midsection which cooperates with the abutment shown in FIG. 8 and FIG. 9 to hold the lower portion of the frame at an angle with respect to the midportion of the frame and yet which allows the lower portion of the frame to pivot rearwardly with respect to the midframe.
Figure 11:
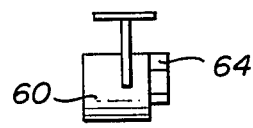
FIG. 11 is a back view of the projection shown in FIG. 10.
Figure 9:
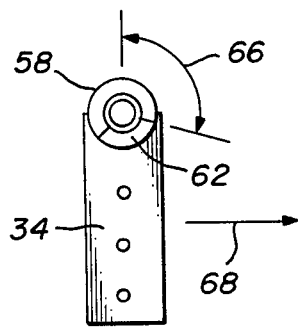
FIG. 9 is an end view of the pivot point illustrated in FIG. 8 showing the 120° arc projection thereon.

The matching abutment or projection 64 is shown in FIGS. 10 and 11 wherein in FIG. 10 the abutment 64 is shown as an end view while in FIG. 11 it is shown as a side view. Note that the abutment 64 also encompasses an arc of 120° and is positioned such that it mates with abutment 62 in a complementary manner and is positioned in the 120° segment of FIG. 9 indicated by arrow 66. Thus, because abutment 62 normally rests against abutment 64, the rake assembly 35 is held in its initial position and cannot move counterclockwise toward bar screen 40 without movement of the midsection 29. Assuming that arrow 68 in FIG. 9 is in the direction of the bar screen 40 and also assuming that abutment 64 is positioned as indicated by the arrow 66 in a complementary relationship with abutment 62, it will be realized that abutment 62 can rotate from its initial position in a clockwise direction away from abutment 64 (away from bar screen 40) but cannot move further in a counterclockwise direction (toward the bar screen 40) since it already rests against projection or abutment 64. Thus, rake assembly 35 is allowed to pivot from its initial position only in a direction away from bar screen 40 if the rake teeth 36 in FIGS. 6 or 7 strikes an obstacle which cannot be moved but it cannot move from its initial position toward bar screen 40 without midsection 29 because of the abutments 64.

FIG. 12 is a schematic side view of the novel raking structure in its upper most position as an alternative embodiment for use with a vertically oriented bar screen and for cleaning debris from the upstream side of the bar screen 40 from the downstream side of the screen. As can be seen in FIG. 12, the bar screen 40 is in a vertical position with respect to channel 42 and the direction of fluid flow is as indicated by arrow 44. It will be noted that the raking structure is positioned on the downstream side of bar screen 40 and the raking arms 34 pivot against the fluid flow 44. If necessary additional arms with counterweights 72 can be added to tube 58 (shown in FIG. 5) to force the rake arms 34 and teeth 36 against the current flow direction 44 to remove the debris on the upstream side of bar screen 40 as indicated by the numeral 74. Microswitches 78 and 80, or any other type of control switch, may be used in any of the embodiments herein to stop or limit motor 22 at the upper most and lower most positions of the rake structure and reverse its direction as necessary.

FIG. 13 is a schematic side view of the novel raking structure of FIG. 12 in its lower most position with the rake teeth 36 penetrating the bars of the debris catching screen 40. As the structure is moved upwardly as previously described, the debris caught by teeth 36 is removed in a well known manner through pivoting discharge plate 70.

FIG. 14 is a schematic side view of the novel raking structure in its upper most position in another alternative embodiment for use with a vertically oriented bar screen and for cleaning debris from the bar screen 40 from the upstream side of the screen. In this case it will be noted again that the bar screen 40 is in the vertical position with respect to channel 42 and that the novel raking apparatus has additional arms with counterweights 72, if needed, as explained previously, to move the rake arms 34 and the associated teeth 36 in the direction of the debris 74 caught against bar screen 40 when the raking apparatus is at its lower most position as shown in FIG. 15.

Thus, the novel raking structure can be used with either sloping or vertical bar screens and can be utilized either on the upstream side of the bar screen or on the lower or downstream side of the bar screen.

Thus, there has been disclosed a novel rake structure for cleaning debris from a bar screen in a liquid carrying channel which has an upper portion which powers the entire structure into and out of the channel, a midsection or control assembly which is rotatably attached to the upper section for movement toward and away from the bar screen and a lower section or rake assembly having rake teeth thereon which is pivotally attached to the lower end of the midsection whereby guide wheels on the upper section and the midsection steer the structure downward in a straight line until it reaches the lowest position of travel at which time the guide wheels on the lower portion of the control assembly leave the first channel that they have occupied and transfer to a second channel in the direction of the bar screen on either the upstream or downstream side thereby carrying the rake assembly from a first position generally spaced from the bar screen to a second position in contact with the debris that may be deposited on the bar screen to remove the debris. Should an essentially immovable object be encountered by the rake teeth, the rake portion can pivot away from the bar screen at the junction where it is attached to the control assembly thus preventing undue stress from suddenly being applied to the rake assembly. The structure is then powered in the upper direction taking with it any debris that may be caught on the teeth and returning the structure to its original position preparatory to commencing another cycle.

While the invention has been described in connection with a preferred embodiment, it is not intended to limit the scope of the invention to the particular form set forth, but, on the contrary, it is intended to cover such alternatives, modifications and equivalents as may be included within the spirit and scope of the invention as defined by the appended claims.

What is claimed is:

1. In a raking apparatus for use in conjunction with a bar screen and a fluid carrying channel to remove debris from said screen and having a stationary guide frame, a reciprocating raking structure mounted for guided movement in said frame and having a rake depending therefrom, guide tracks on said guide frame for receiving and directing guide means on said raking structure, drive means coupled to said guide frame and said raking structure for movement of said raking structure up and down said guide tracks into and out of said fluid carrying channel, and means for causing said rake to move from a first position generally spaced from said screen to a second position generally adjacent said screen at the bottom of said downward movement of said raking structure for contacting and removing debris caught on said bar screen as said raking structure is moved upwards out of said channel, the improvememt comprising:
   a. an upper carriage section of said raking structure for guided reciprocal movement toward and away from said fluid carrying channel;
   b. a midsection generally spaced from said bar screen and rotatably coupled to said upper section for pivotal movement toward and away from said bar screen; and
   c. a lower section including said rake pivotally coupled to said midsection in an initial position; said lower section having pivotal movement, from said initial position with respect to said midsection, only in a direction away from said bar screen such that when said rake enounters an obstacle too large to remove as said midsection moves toward said bar screen, said lower section pivots from said initial position in a pivotal direction away from said bar screen as said midsection continues said movement toward said bar screen.

2. The improved raking structure of claim 1 further comprising:
   a. guide tracks attached to said guide frame for carrying said rake along a path downwardly into said fluid channel in a first position generally spaced from said bar screen, forwardly in the direction of said bar screen at the bottom of said downward movement of said raking structure from said first position to said second position generally adjacent said bar screen, and upwardly out of said fluid channel, and
   b. guide means located at said pivotal coupling of said lower section and said midsection for being received and directed by said guide tracks to carry said rake along said path.

3. The improved raking structure of claim 2 wherein said lower section comprises:
   a. a rake assembly having said rake attached thereto, and
   b. means for pivotally attaching said rake assembly to the lower portion of said midsection in said initial position at an angle thereto and allowing said rake to pivot from said initial position only in a direction away from said bar screen as said midsection moves toward said bar screen if said rake meets an obstacle too large to remove while allowing said midsection to continue forward movement toward said bar screen.

4. The improved raking apparatus of claim 3 wherein said guide tracks comprise:
   a. a first channel for receiving said guide means to enable downward movement of said rake structure into said channel,
   b. a second channel parallel to and spaced from said first channel in the direction of said bar screen for receiving said guide means to allow upper movement of said rake structure out of said channel, and
   c. a transfer movement channel for coupling said lower end of said first channel with said lower end of said second channel whereby said guide means moves from the lower end of said first channel to the lower end of said second channel for upward movement thereby causing said midsection to pivot about said notatable coupling with said upper section and carry said rake forward to said second position in the direction of said bar screen.

5. The improved raking apparatus of claim 4 further comprising:
   a. an upwardly angled channel connecting the upper end of said second channel to said first channel whereby as said rake moves upwardly carrying said debris, said guide means in said second channel is guided back into said first channel for returning said rake structure to its upper most position, and
   b. a pivotable gate member closing said angled channel, said gate pivoting to allow said upward moving guide means in said second channel to enter said first channel but preventing said downward moving guide means in said first channel from entering said second channel through said said gate thereby enabling said guide means to move to the bottom of said first channel before transfering to said second channel.

6. The improved raking apparatus of claim 5 further comprising:

a. at least one arm extending from said rake midsection opposite the direction of said bar screen, and b. a counterweight positioned on said arm to force said control assembly to pivot about said notatable coupling in the direction of said bar screen at the bottom of said first channel thereby causing said rake to move from said first position to said second position in the direction of said bar screen to contact said debris.

7. The improved raking structure of claim 6 further comprising:

a. a first projection on said midsection at said pivotal coupling of said midsection to said rake assembly, and b. a second projection on said rake assembly for engaging said first projection such that said rake assembly is held in its initial position at an angle with respect to said midsection and is prevented from pivotal movement from its initial position in the pivotal direction of said bar screen but is allowed to pivot from its initial position in a pivotal direction away from said bar screen whereby when said midsection moves forward in the direction of said bar screen carrying said rake assembly from said first position to said second position, said rake assembly is enabled to absorb shock created when encountering an obstacle too large to move by rotating from its initial position in a direction away from said bar screen while said midsection continues its forward motion toward said bar screen.

8. An improved raking structure of claim 7 wherein:

a. said first projection is an arc shaped projection encompassing an angle of approximately 120°, and b. said second projection is an arc shaped projection encompassing an angle of approximately 120° in abutting engagement with said first projection whereby rotation of said second projection with respect to said first projection in the direction of said bar screen is prohibited while rotation of said second projection with respect to said first projection away from the direction of said bar screen is allowed.

9. An improved raking structure as in claim 8 wherein said drive means comprises:

a. a gear rack attached to said frame, and b. a motor driven gear mounted on said upper section for engaging said gear rack for moving said rake structure up and down said channel members.

10. An improved raking structure as in claim 9 further including:

a. a first limit switch for stopping said motor at the top of said upper movement of said rake structure, and b. a second limit switch for stopping and reversing said motor at the bottom of said downward movement of said structure.

11. An improved raking structure as in claim 1 further including:

a. means for mounting said bar screen in said fluid channel in a vertical position, and b. means for mounting said rake structure on the downstream side of said bar screen whereby said rake pivots in the direction of said bar screen against the direction of fluid flow in said channel.

12. An improved raking structure as in claim 1 further including:

a. means for mounting said bar screen in said fluid channel in a vertical position, and b. means for mounting said rake structure on the upstream side of said bar screen whereby said rake pivots in the direction of said bar screen with the direction of fluid flow in said channel.

13. An improved raking structure as in claim 1 further including:

a. means for mounting said bar screen in said fluid channel at an angle to the vertical, and b. means for mounting said rake structure parallel to said bar screen on the upstream side of said bar screen whereby said rake pivots in the direction of said bar screen with the direction of fluid flow in said channel.

14. A method of improving a raking structure for up and down movement into and out of a fluid flow channel to remove debris caught and retained by a bar screen therein comprising the steps of:

a. guiding an upper carriage section of said raking apparatus for reciprocating travel towards and away from said fluid carrying channel, b. rotatably coupling a midsection to said upper section for rotatable movement toward and away from said bar screen, and c. pivotally attaching a lower section, including said rake, to said midsection in an initial position for movement with said midsection from a first position spaced from said bar screen to a second position generally adjacent said bar screen to enable debris to be removed from said bar screen, said lower section having pivotal movement from said initial position with respect to said midsection only in a pivotal direction away from said bar screen such that when said rake encounters an obstacle too large to remove, said lower section pivots from said initial position in a direction away from said bar screen as said midsection continues said movement toward said bar screen.

15. The improved method of claim 14 further comprising the steps of:

a. attaching guide tracks to said guide frame for carrying said rake and said midsection along a path downwardly into said fluid channel in said first position generally spaced from said bar screen, forwardly in the direction of said bar screen at the bottom of said downward movement of said raking structure from said first position to said second position generally adjacent said bar screen, and upwardly out of said fluid channel, b. guide means located at said pivotal attachment of said midsection to said lower section, and c. receiving said guide means in said guide tracks for guiding said midsection along said path.

16. The improved method of claim 15 wherein the step of pivotally attaching said lower section to said midsection further comprises the steps of:

a. attaching a rake to said lower section, and b. pivotally attaching said lower section to the lower portion of said midsection in said initial position at an angle thereto when said midsection is in said first position spaced from said bar screen and allowing said rake to pivot from said initial position only in a pivotal direction away from said bar screen as said midsection moves toward said bar screen if said rake meets an obstacle too large to remove while allowing said midsection to continue forward movement toward said bar screen.

17. The improved method of claim 16 wherein the step of carrying said midsection along said path further comprises the steps of:
   a. providing a first channel for receiving said guide means to enable downward movement of said rake structure into said fluid channel,
   b. providing a second channel parallel to and spaced from said first channel in the direction of said bar screen for receiving said guide means and allowing upward movement of said rake structure out of said channel, and
   c. coupling said lower end of said first channel with said lower end of said second channel by a transfer movement channel whereby said guide means moves from the lower end of said first channel to the lower end of said second channel for upward movement thereby causing said midsection to pivot about said notatable coupling with said upper section and carry said rake forward to said second position in the direction of said bar screen.

18. The improved method of claim 17 further including the steps of:
   a. connecting the upper end of said second channel to said first channel with an upwardly angled channel whereby as said rake moves upwardly carrying said debris, said guide means in said second channel is guided back into said first channel for returning said rake structure to its upper most position, and
   b. closing said angled channel with a pivotal gate member, said gate pivoting to allow said upward moving guide means in said second channel to enter said first channel but preventing said downward moving guide means in said first channel from entering said second channel through said gate thereby enabling said guide means to move to the bottom of said first channel before transfering to said second channel.

19. The improved method of claim 18 further comprising the steps of:
   a. extending at least one arm from said midsection opposite the direction of said bar screen, and
   b. positioning a counterweight on said arm to cause said midsection to pivot about said notatable coupling in the direction of said bar screen thereby causing said rake to move in the direction of said bar screen to contact said debris.

20. The improved method of claim 19 further comprising the steps of:
   a. forming a first projection on said midsection at said pivotal attachment of said midsection to said rake assembly, and
   b. forming a said second projection on said rake assembly for engaging said first projection such that said rake assembly is held in its initial position at an angle with respect to said midsection and is prevented from rotational movement from its initial position in the direction of said bar screen but is allowed to pivot from its initial position in a direction away from said bar screen whereby when said midsection moves forward in the direction of said bar screen carrying said rake assembly from said first position to said second position, said rake assembly is enabled to absorb shock created when encountering an obstacle too large to remove by rotating from its initial position in a direction away from said bar screen while said midsection continues its forward motion toward said bar screen.

21. An improved method of claim 20 further comprising the steps of:
   a. forming said first projection in an arc shape encompassing an angle of approximately 120°, and
   b. forming said second projection in an arc shape encompassing an angle of approximately 120° in abutting engagement with said first projection wherby rotation of said second projection with respect to said first projection in the direction of said bar screen is prohibited while rotation of said second projection with respect to said first projection in a direction away from said bar screen is allowed.

22. An improved method as in claim 21 further comprising the steps of:
   a. attaching a gear rack to said frame, and
   b. mounting a motor driven gear on said upper section for engaging said gear rack for moving said rake structure up and down said channel members.

23. An improved method as in claim 22 further comprising the steps of:
   a. providing a first limit switch for stopping said motor at the top of said upper movement of said rake structure, and
   b. providing a second limit switch for stopping and reversing said motor at the bottom of said downward movement of said structure.

24. An improved method as in claim 14 further including the steps of:
   a. mounting said bar screen in said fluid channel in a vertical position, and
   b. mounting said rake structure on the downstream side of said bar screen whereby said rake pivots in the direction of said bar screen against the direction of fluid flow in said channel.

25. An improved method as in claim 14 further including the steps of:
   a. mounting said bar screen in said fluid channel in a vertical position, and
   b. mounting said rake structure on the upstream side of said bar screen whereby said rake pivots in the direction of said bar screen with the direction of fluid flow in said channel.

26. An improved method as in claim 14 further including the steps of:
   a. mounting said bar screen in said fluid channel at an angle to the vertical, and
   b. mounting said rake structure parallel to said bar screen on the upstream side of said bar screen whereby said rake pivots in the direction of said bar screen with the direction of fluid flow in said channel.

* * * * *